United States Patent
Kley (10) Patent No.: US 7,503,206 B2
(45) Date of Patent: Mar. 17, 2009

(54) FLUID DELIVERY FOR SCANNING PROBE MICROSCOPY

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 0 days.

(21) Appl. No.: 11/244,312

(22) Filed: Oct. 4, 2005

(65) Prior Publication Data

US 2006/0150721 A1    Jul. 13, 2006

Related U.S. Application Data

(62) Division of application No. 10/659,737, filed on Sep. 9, 2003, now Pat. No. 6,998,689.

(60) Provisional application No. 60/433,242, filed on Dec. 12, 2002, provisional application No. 60/409,403, filed on Sep. 9, 2002.

(51) Int. Cl.
*G01N 13/10* (2006.01)
*B82B 3/00* (2006.01)

(52) U.S. Cl. .......................... 73/105; 977/902
(58) Field of Classification Search .................. 73/105; 29/407.01; 977/902
See application file for complete search history.

(56) References Cited

U.S. PATENT DOCUMENTS

| | | | |
|---|---|---|---|
| 6,752,008 B1 * | 6/2004 | Kley | 73/105 |
| 6,802,646 B1 * | 10/2004 | Kley | 977/902 X |
| 6,880,388 B1 * | 4/2005 | Kley | 73/105 |
| 6,923,044 B1 * | 8/2005 | Kley | 73/105 |

FOREIGN PATENT DOCUMENTS

WO    WO 9834092 A2 *   8/1998

* cited by examiner

*Primary Examiner*—Thomas P Noland
(74) *Attorney, Agent, or Firm*—Townsend and Townsend and Crew LLP (57) ABSTRACT

The following invention pertains to the introduction of a gas (or fluid) around a SPM probe or nanotool™ to control chemical activity e.g. oxygen to promote oxidation, argon to inhibit oxidation or clean dry air (CDA) to inhibit moisture to control static charging due to the action of the probe or nanotools and to provide vacuum at and around the tip and substrate area. The invention can also produce electrical current for use with active electronic devices on, in or near the body of the device. In addition by use of a fluid like water, certain oils, and other liquids in conjunction with specific tip structure either electric discharge machining can be used at the tip area on the tip itself (in conjunction with a form structure on the work piece) or on a work piece beneath the tip to shape, polish and remove material at very small scales (10 microns to 1 nm or less).

6 Claims, 8 Drawing Sheets

FLUID DELIVERY FOR SCANNING PROBE MICROSCOPY

CROSS-REFERENCES TO RELATED APPLICATIONS

This application is a Divisional Application of U.S. application Ser. No. 10/659,737, filed Sep. 9, 2003, which claims priority from U.S. Provisional Application No. 60/409,403, filed Sep. 9, 2002 and from U.S. Provision Application No. 60/433,242, filed Dec. 12, 2002, all the disclosures of which are hereby incorporated by reference in their entirety for all purposes.

This application is related to U.S. Application Nos.:
Ser. No. 10/094,149, filed Mar. 7, 2002, now U.S. Pat. No. 6,802,646;
Ser. No. 10/094,411, filed Mar. 7, 2002, abandoned;
Ser. No. 10/094,408, filed Mar. 7, 2002, now U.S. Pat. No. 6,923,044;
Ser. No. 10/093,842, filed Mar. 7, 2002;
Ser. No. 10/094,148, filed Mar. 7, 2002, now U.S. Pat. No. 6,752,008; and
Ser. No. 10/228,681, filed Aug. 26, 2002, now U.S. Pat. No. 6,880,388 the disclosures of which are hereby incorporated by reference for all purposes.

BACKGROUND OF THE INVENTION

The present invention relates generally to microelectromechanical systems (MEMS), and in particular to techniques for fluid delivery in applications involving nanometer-scale operations, such as assays and/or amplification and subsequent modification of DNA in biochips. In addition this invention can be used to remove or add material via chemical, electro-chemical, biochemical, mechanical and electrical methods in small controlled regions down to atomic dimensions of 0.1 nanometer.

Nanometer-scale components find utility in a wide variety of fields, particularly in the fabrication of microelectromechanical systems (MEMS). Typical MEMS include microsensors, micro-actuators, micro-instruments, micro-optics, and the like. Nanotechnology refers to broad categories of nanometer-scale manufacturing processes, materials and devices, including, for example, nanometer-scale lithography and nanometer-scale information storage. Many MEMS fabrication processes exist, including, for example surface micromachining techniques. Surface micromachining involves fabrication of microelectromechanical systems from films deposited on the surface of a substrate. For example, a common fabrication process includes depositing thin layers of polysilicon on a sacrificial layer of silicon dioxide formed on a bulk silicon substrate. Controlled removal of the selected portions of the various layers of material can produce useful micro- and nano-scale machine components.

Conventional semiconductor processing typically is performed in vacuum. The nature of the surrounding ambient is important. Often a dry ambient is required to avoid oxidizing and otherwise contaminating the surface of the silicon surface. Presently static conditions, vacuum generation, moisture problems and/or chemical reactivity control is obtained in SPM (scanning probe microscopy) systems and nanomachining centers by the introduction of large quantities of gas (including CDA, clean dry air) at some distance many inches or more away from the probe subject site. These gross-scale manipulations of fluid are at odds with the fine-scale operations required in nanotechnology-based machining systems. To date, no suitable techniques exist to provide for more effective gas and vacuum delivery in the proximity of a site being worked by a nanomachining process.

SUMMARY OF THE INVENTION

A micro electromechanical systems (MEMS) device is configured with fluidic channels to perform various tasks, including measuring and nanomachining a workpiece. One or more isotopic regions can be provided to further enhance the measuring function and to enhance nanomachining operations. The isotopic region(s) can provide power to a workpiece.

DESCRIPTION OF THE SPECIFIC EMBODIMENTS

Figure 1:
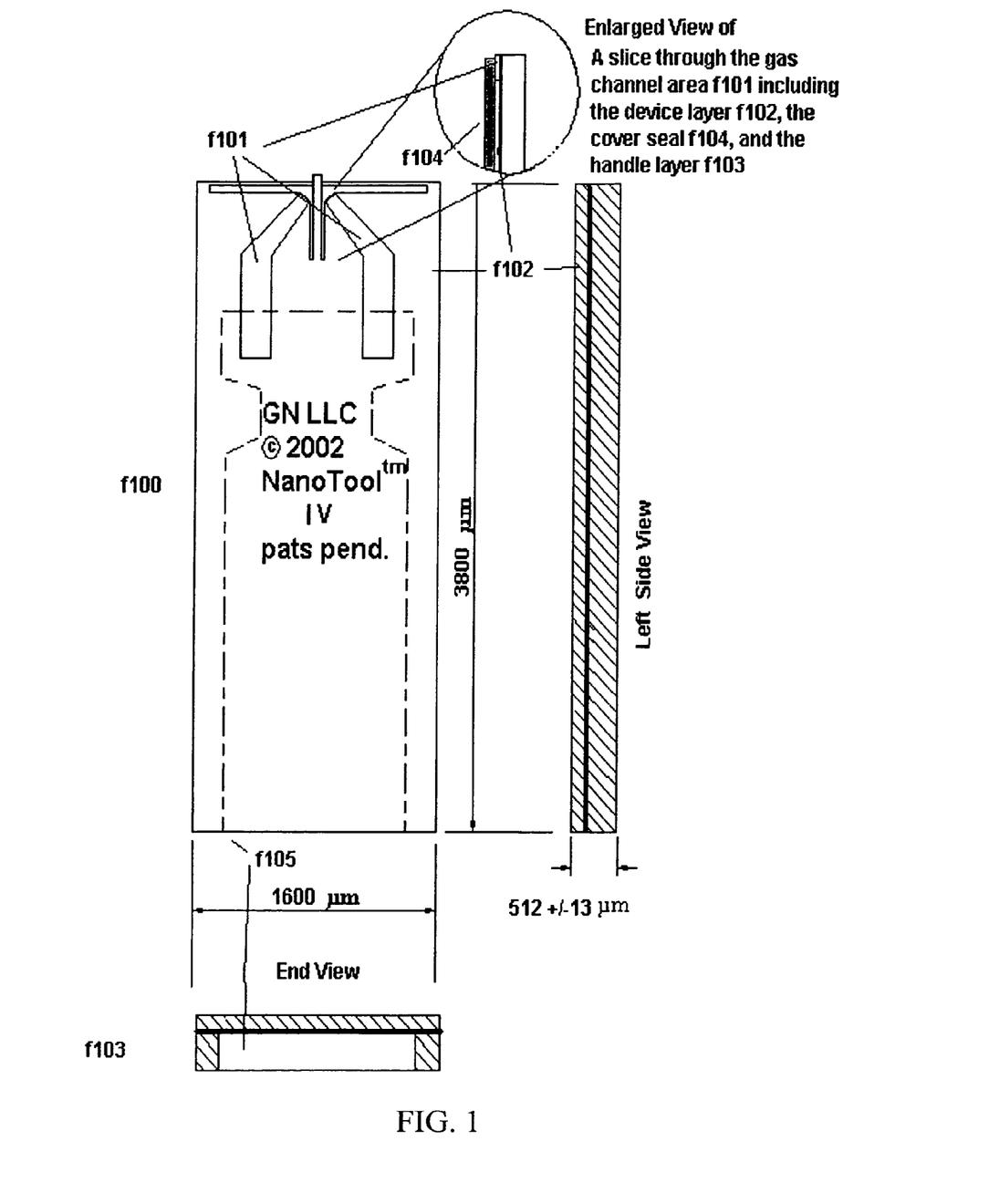
FIG. 1 is a schematic illustration of an embodiment of a micro electro-mechanical systems (MEMS) cantilever according to one aspect of the present invention.

FIG. 1 shows an SOI (silicon on insulator) MEMS cantilever f100 having gas channels f101 formed in the device layer. Each channel is fed via a recess f105 (shown in phantom) formed in the body of in the handle layer f103 of the cantilever f100. The recess is therefor in fluid communication with the channels f101. Gas introduced through the floor plate or gas feed tube (not shown) from a gas source (not shown) is thereby delivered via the recess f105 to the channels f101 and finally to a region of the tip at the end of the cantilever f100.

As can be seen in the enlarged view, a cover seal (or cover layer) f104 can be provided to contain the gas pressure that can be developed at the tip. In one embodiment, the cover seal can be any suitably patterned thin material including adhesive plastic films, silicon cover structure, or diamond film cover structure. These latter materials may be bonded by coating with Titanium, Nickel and Copper layers to make a Copper vacuum furnace bond, or by using conventional low temperature eutectic bonds such as a Ge/Ag, Ge/Au, In/Pt, In/Pa or In/Ag to a similarly coated device layer or other mechanically strong layer sufficient to contain the gas pressures used. This latter cover layer may be disposed so as to reduce the etched gap between the arms and the tip portion of the primary cantilever and in fact may overlap the cantilever end if it is suitably relieved by etching or other means to have clearance similar or identical to the clearance between the back of the primary cantilever and the secondary cantilever or a backing beam.

Figure 2:
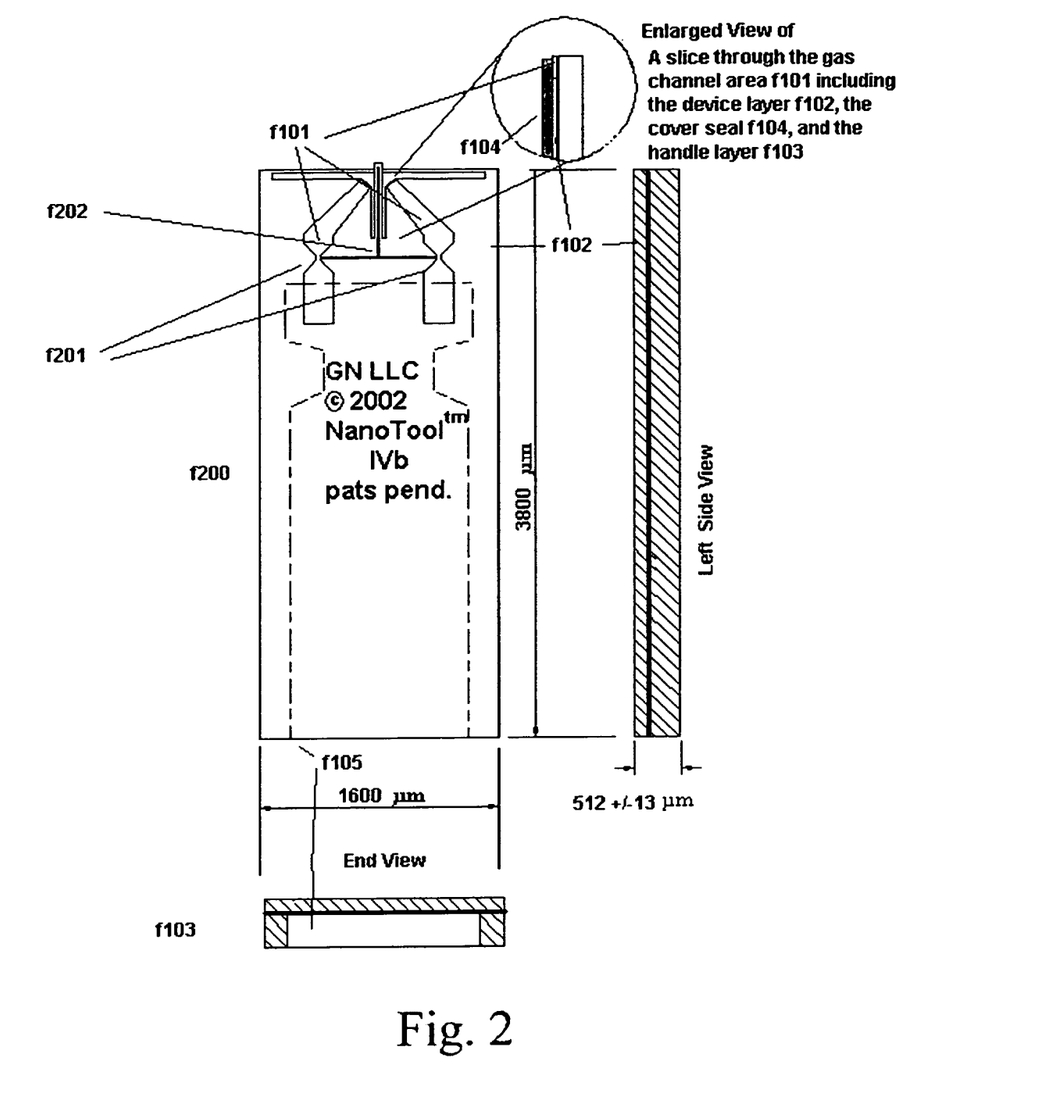
FIG. 2 is a schematic illustration of another embodiment of a MEMS cantilever according to another aspect of the present invention.

In FIG. 2, a variation of the cantilever structure illustrated in FIG. 1 is shown. In this variation of the cantilever f200, venturi structures f201 (venturi tubes) are formed in a portion of the gas channels f101. Tubes f202 lead away and interconnect to the area of the tip on the cantilever to provide a vacuum that is suitable for special functions such as new measurement and material modification means. A vacuum produced by this configuration may also be used for other purposes including a vacuum clamping system which retains the whole assembly (including an attached base plate on the handle layer) onto the instrument or tool in use.

Figure 1A:
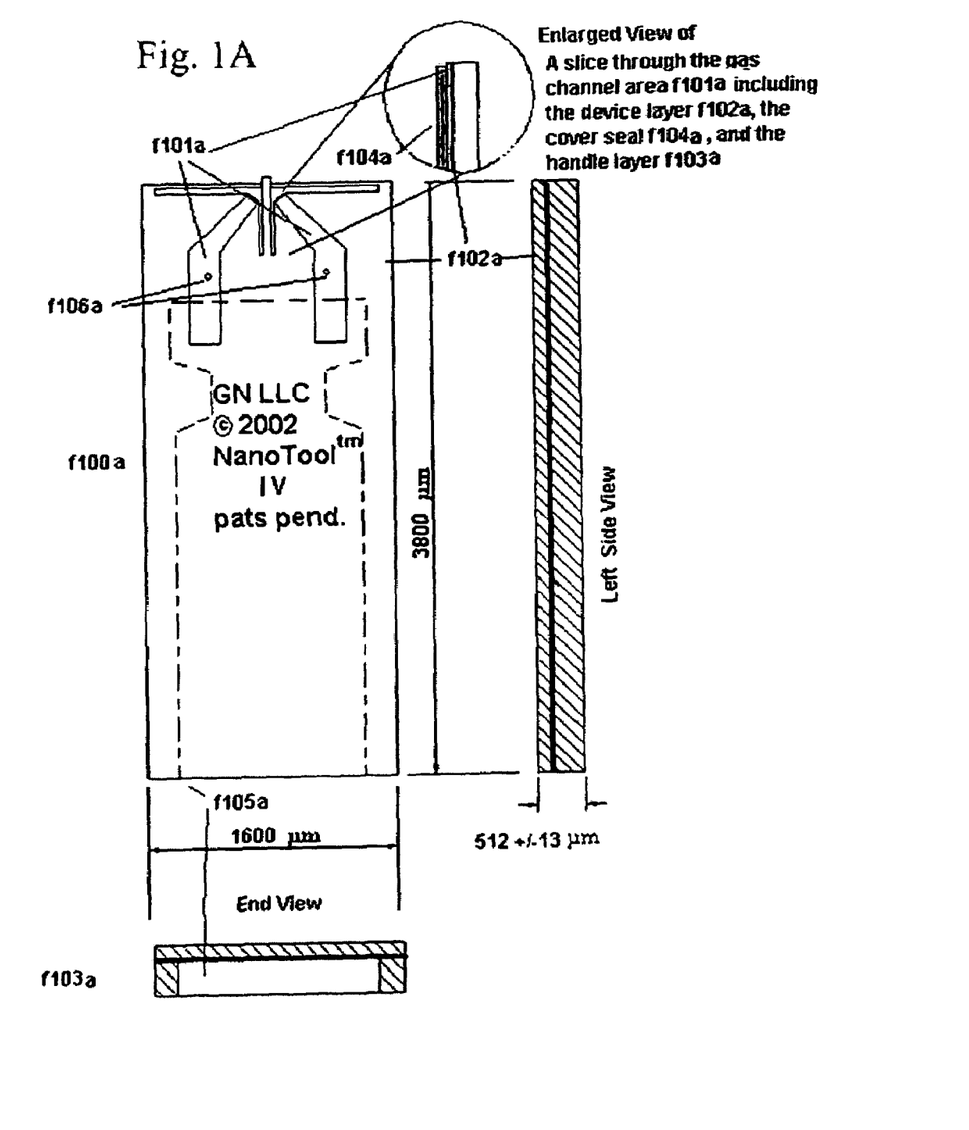
FIG. 1A shows a variation of the MEMS cantilever illustrated in FIG. 1.
Figure 1B:
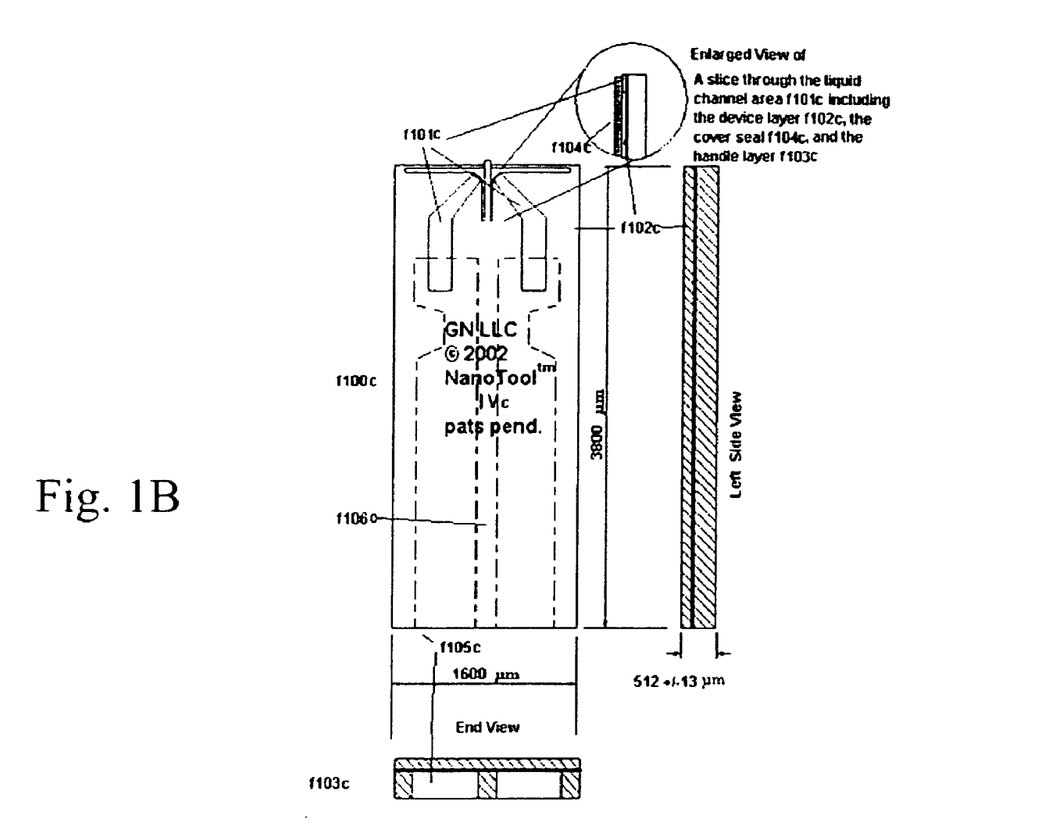
FIG. 1B shows yet another variation of the MEMS cantilever illustrated in FIG. 1.
Figure 3:
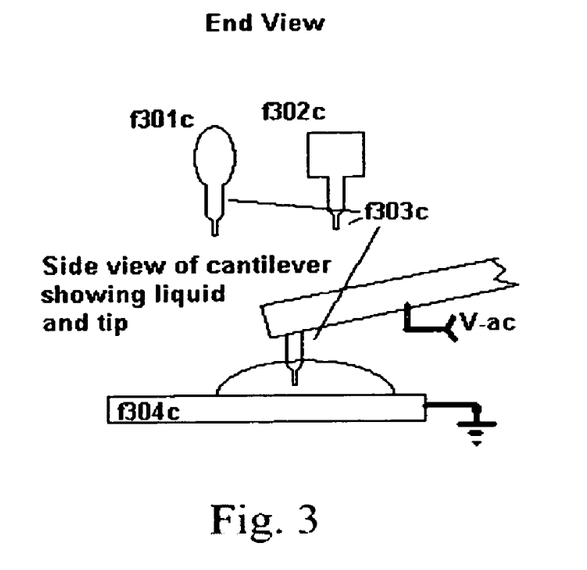
FIG. 3 is a diagrammatic illustration of a cantilever tip used in the formation of a microbubble or a nanobubble in accordance with an aspect of the present invention.

In FIG. 2 and also in FIG. 1A and FIG. 1B, a fluid (e.g., water) may be placed in the gas channel or delivered to the gas channel using the same mechanism and pathways as the selected gases described herein. Here as shown in FIG. 3 a tip with a flat end directly proportional in diameter to the desired microbubble or nanobubble to be formed is driven by (typically) a piezoelectric excitation system. The excitation system can be the same system that is used to excite the cantilever for AFM scanning, for example. The excitation system increases its amplitude such that cavitation bubbles are formed at the end of the tip and at a known distance away from the work surface. These cavitation bubbles may be used to machine a target surface. The cavitation bubbles can be used to illuminate, by the sonoluminescence effect, a particular spot on a work piece, or initiate a photo induced reaction into a work piece. The target piece or workpiece can be viable DNA.

Figure 2A:
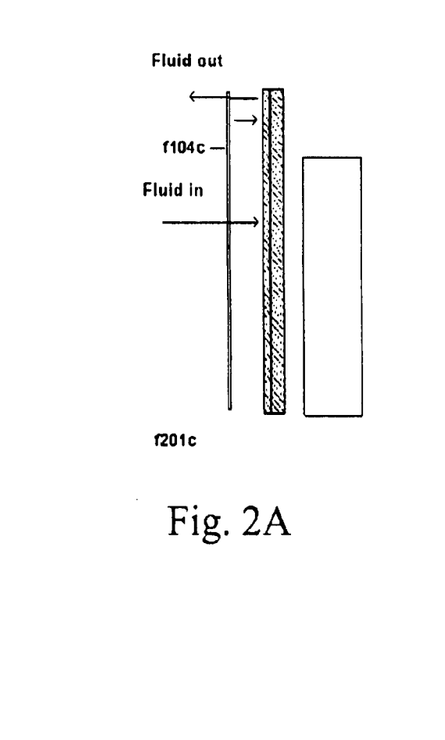
FIG. 2A illustrates fluidic flow in accordance an embodiment of the present invention.

The fluid can be withdrawn from the area of the tip using the capillary action within the fluid, the maintenance of wetable surfaces in the channel, and the application of some backpressure on the fluid. Additionally, as shown in FIGS. 1A and 2A, fluid (including gas) may be continuously removed and replenished or otherwise recirculated after being modified (for example, due to filtering, cooling or heating, or otherwise chemically changed) so as to maintain specific conditions at the tip and sample. Alternatively, the fluid may be expelled in metered ways from the ends of the gas channel by a pulse pressure.

Figure 2B:
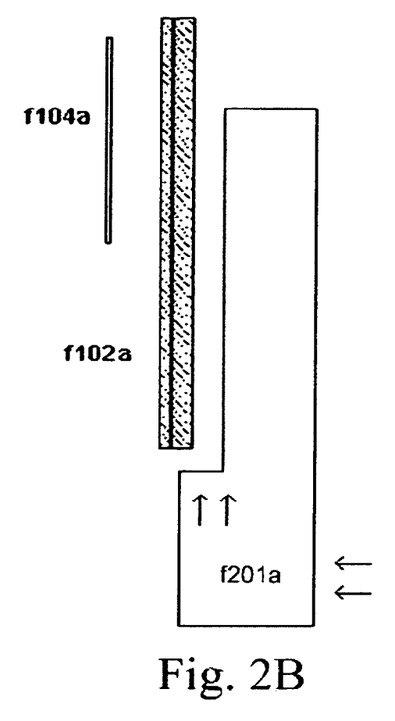
FIG. 2B is an exploded side view showing fluid flow in accordance with an embodiment of the present invention.

FIGS. 2B is a schematic exploded side view of a holder f201a and a cantilever f102a received in the holder. A cover seal f104a is shown separated from the cantilever f102a. The holder f201a is configured for fluid flow in the direction shown by the arrows. Fluid enters from the right-bottom portion of the holder f201a, exiting the holder at a location where the base of the cantilever f102a is received. With reference to FIG. 1, the fluid exiting the holder f201a enters the recess f105 from the base of the cantilever f102a.

Figure 2C:
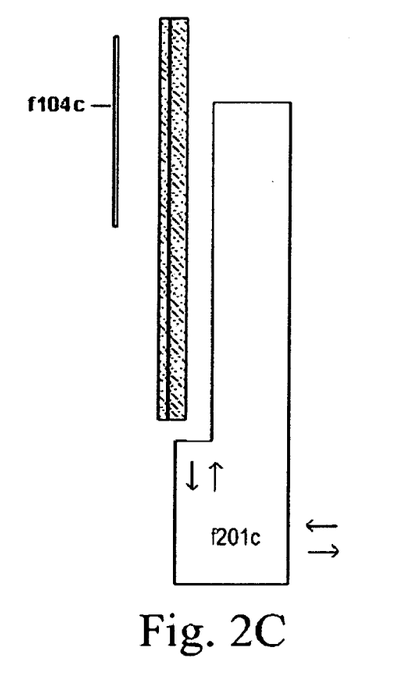
FIG. 2C is an exploded side view showing fluid flow in accordance with another embodiment of the present invention.

FIG. 2C is a schematic exploded side view of a holder f201c and a cantilever received in the holder. A cover seal f104c is shown separated from the cantilever. The holder f201c is configured for bidirectional fluid flow as shown by the arrows. Fluid enters and exits from the right-bottom portion of the holder f201c, exiting and entering the holder at a location where the base of the cantilever is received.

In another embodiment, chemical, optical and/or electrical means may be provided through and/or with the tip to perform measurements at the tip region, or to effect other processes in the region of the tip with or without the benefit of fluid or gas delivered to the tip region. One or more streams of gas and/or fluid delivered to the tip region may also be used to induce reactions or processes suitable to the goals of measurement or process development. Specifically these latter techniques are well suited to be used with biological or chemical cell assemblies, sometimes referred to as biochips, such as those made by Affymetrix. In a biochip, the local region of fluid control and/or tip activity is substantially smaller than the size and volume of the biochip cell. Furthermore these biochips are commonly caused to fluoresce on the activated DNA sites and the resulting light emission in conjunction with light sensitive tips can be used to locate the actual DNA directly. The DNA can then be removed and moved to another location for further operations. The DNA can be processed on site in the biochip. This light driven location would simply consist of monitoring the light received by the control computer or logic and/or memory and then mapping the region(s) of maximum and minimum light output for operations to be directed subsequently by the operator or a computer and or logic and/or memory based director. Alternately the fluid may be expelled in metered ways from the ends of the gas channel by a pulse pressure.

In still another embodiment, one or more diaphragms (electrostatically, piezoelectrically, or thermally actuated) can be integrated into the cantilever f100 via known MEMS techniques to provide gas flow (such as by applying a vacuum or lower pressure to the channels) or fluid flow through the channels from a source of gas or fluid that is provided to the device. Alternatively, a co-resonant pendulum pump with or without valves (as shown in the views of FIGS. 5a -5F), and/or thermal (pressure differential by fluid or gas heating) pumps can be incorporated into the cantilever f100 also using known MEMS techniques to provide gas or fluid to the tip. This aspect of the invention avoids having to directly connect the cantilever to an external supply to provide the fluid flow and control. A local and/or MEMS based flow control may also be used to regulate an external supply or server as an additional regulation of the diaphragm or thermal pumps above.

Further the fluid or gas may be further shaped and guided by the arrangement shown in FIG. 1C so that the flow is orthogonal to the cantilever and below the lowest part of the cantilever so that the region of flow is not in contact with the cantilever. Alternatively, the cantilever shown in FIG. 3, at f301c, is streamlined to lower its damping by the fluid and to eliminate the formation in liquids of cavitation bubbles from the surfaces orthogonal to its motion. Additionally the channel arms may be movable and can be configured to have a spring constant such that a sufficiently strong vacuum source applied to the channels causes the arms to mechanically engage the tip platform. This would mechanically constrain its motion or make it move toward one channel or the other (the channel in which the vacuum is applied). The mechanical constraints are removed when normal or positive pressure is applied to channel(s). By this means, the tip platform may be moved or scanned over the surface or clamped in between the channels alternate means well know in the MEMS art may be used to move the channel arms in x, y and z axis including independent thermal, electrostatic and piezoelectric translation of all or any of the arms. Furthermore, the channel arms may be arranged to lie over secondary cantilevers (which are described in more detail in one or more of the above-referenced applications) such that these cantilevers do not extend to the area of the primary cantilever. Instead, when the movable arms are used to clamp the primary cantilever the whole clamped assembly is free to move back until each clamp arm of the assembly encounters a secondary cantilever with a corresponding increase in spring constant from these structures. Furthermore when driven independently, the instant of electrical contact of any given arm with the structure to be clamped can be sensed and used by an external controller or analog circuit to control the clamping force and motion of the arm so that a given displacement of the clamped structure can be obtained (including zero displacement). The motion of the arms can also be sensed by conventional piezoelectric and piezoresistive methods.

Furthermore as shown above in FIG. 2 and FIGS. 1A and 1B, another fluid and in particular a dielectric fluid, like electrical discharge machining oil (typically, a kerosene like oil well known in the machine tool industry) may be introduced around the work piece (tool form to form a particular shape on the tip by suitably placing a bias voltage—dc offset ac voltage or simple dc voltage under which workpiece or sample material will be removed from the anode whether that is the work piece or the GN probe see FIG. 3). For this purpose, conductive diamond is especially appropriate because its ability to conduct away heat reduces its erosion wear substantially. Another useful material is tungsten.

Figure 1C:
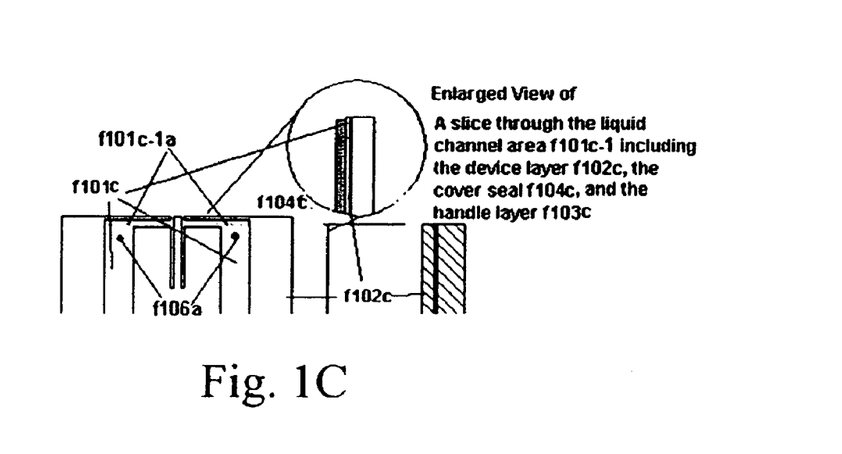
FIG. 1C shows a variation of the MEMS cantilever illustrated in FIG. 1B.
Figure 4:
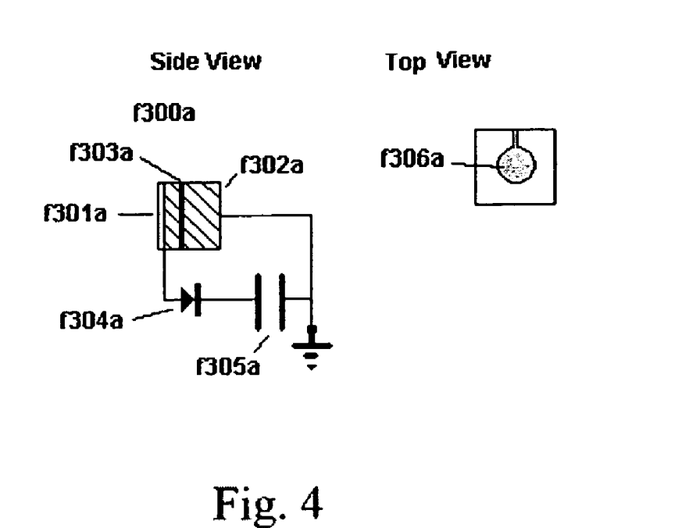
FIG. 4 is a schematic representation of a cantilever tip configured as a nanogenerator in accordance with an aspect of the present invention.
Figure 5A:
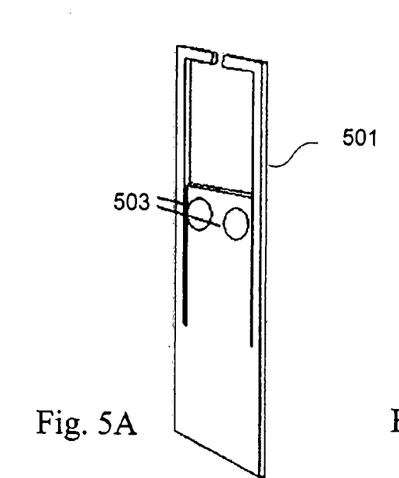
FIGS. 5A-5F illustrate views of a cantilever configured with valves for gas flow in accordance with an aspect of the present invention.
Figure 5B:
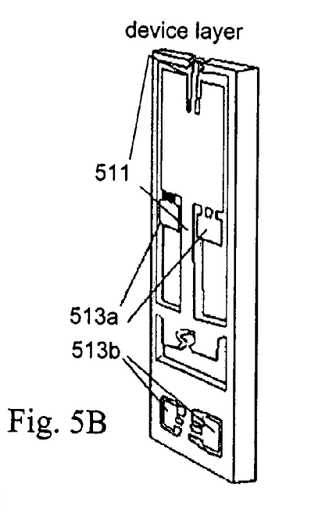
Figure 5C:
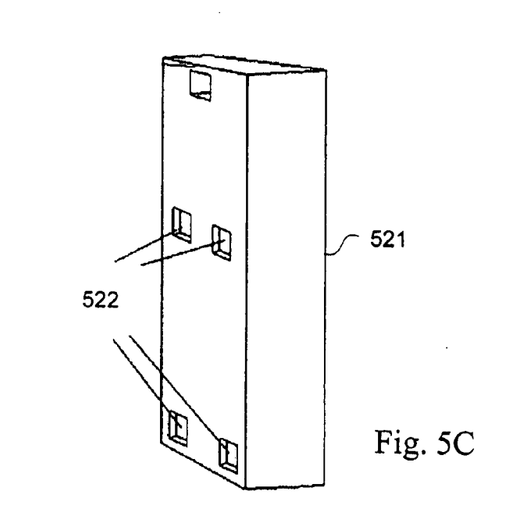
Figure 5D:
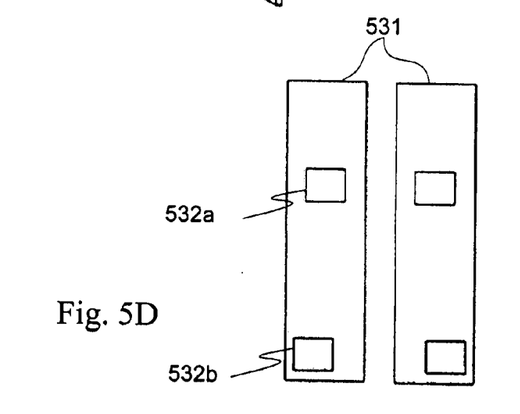
Figures 5E, 5F:
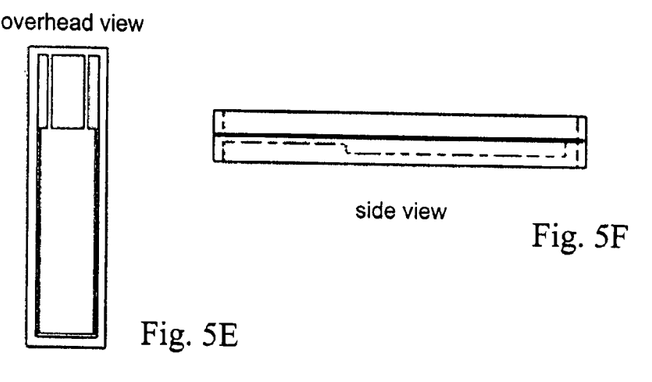

Finally, in either embodiment shown in FIGS. 1, 2, or 1C, a conventional isotope or electrical emitters may be introduced in the main gas channel f105 formed in the handle f103, or in the individual gas channels f101 in the device layer via openings f106a. A further embodiment is to use a total of 0.99 or less microcurie of radioactive material in total (sum of all material applied to the device) in order to meet national and international maximums for unregulated transport and use of radioactive materials. Another embodiment is to use Americium 241 which is commonly used in smoke detectors as the isotopic source of alpha particles. These emitters will form ions in the gas flowing around them which can then be used to charge or neutralize charge around the tip area where measurement or surface modification is taking place. The gas flow rate determines the charge transfer rate out of the channels. The gas flow can be monitored by conventional measuring by techniques the charge across the channel through connections. This aspect of the invention is shown in FIG. 4. The voltage is measured at the integration point (connection between the diode and the capacitor) with a resistor discharging the voltage so as to correlate with rate of charge transfer and removal by gas flow.

A further embodiment of the nuclear emitter is shown in FIG. 4. Here a complete nanogenerator is formed in which the electrical energy of nuclear decay from an isotope at f306a is captured by conductive layer f301a which may be in close contact. An intrinsic silicon diode, or intrinsic diamond diode, or intrinsic SiC diode formed by CVD (chemical vapor deposition) growth of an oriented boron doped diamond layer followed by the growth of an intrinsic or ultra pure undoped diamond layer or diode junction is electrically arranged to provide a current of secondary holes or electrons from the ionizing action (attached to the device layer which may also be conductive) and insulated from the ground layer on which the isotope is electrodeposited or affixed at f302a. This voltage is then integrated by the simple diode and capacitor circuit shown as f304a and f305a. The diode and capacitor may be integrally formed on the silicon MEMS device. In this way, a quantity of current is available for any general use by making a connection to the conductor that connects f304a and f305a. Many nanogenerator regions may be made and integrated on one device such that under normal circumstances no local concentration of isotopic material will exceed the legally accepted microcurie concentration per unit area of the device. Furthermore the intrinsic diode may be spaced away from the radiation source by a hard vacuum and an internal thin metal diaphragm which may be released by the passage of current through one of its support arms allowing the other support bar to roll it up and out of the way of the radiation source. By the latter means the generator diode can be protected from radiation damage while in storage and the storage life can be extended to hundreds of years.

In another embodiment, the intrinsic diamond layer may be grown or mechanically contacted against a doped SiC (silicon carbide) crystal with a boron doped diamond layer (either random or aligned biased grown) grown on the other side of the intrinsic diamond away from the SiC. An additional embodiment includes a conductor followed by an intrinsic SiC layer grown on top of a doped SiC layer. In this and the former embodiments, these structures may also be used as radiation detectors for forms of radiation which give rise to detectable electronic or optical changes in the layered diode structure.

Figure 6:
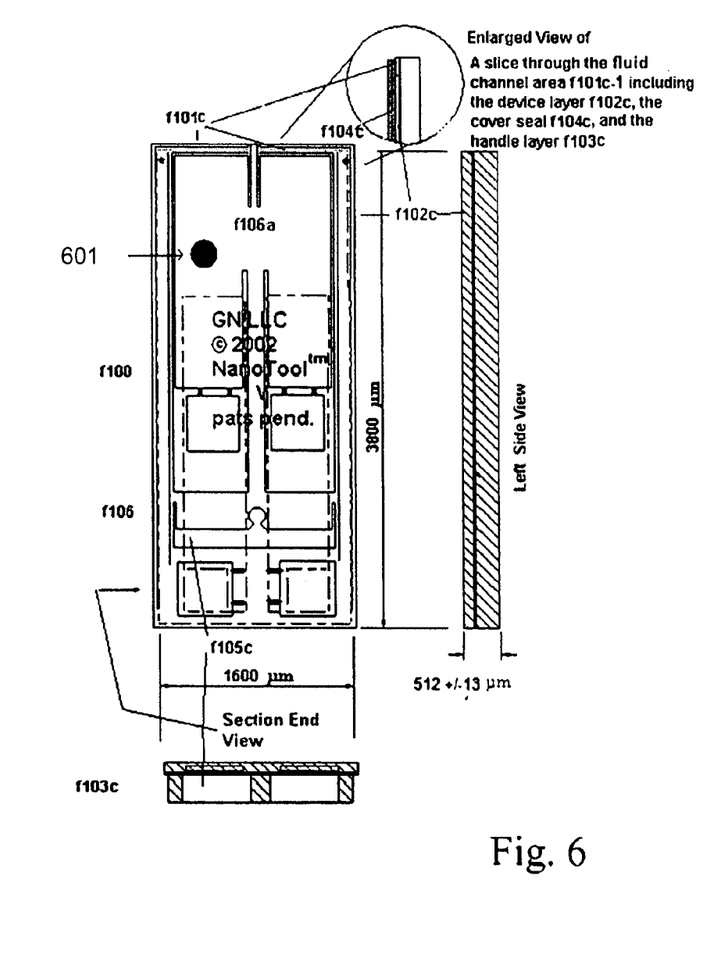
FIG. 6 shows a variation of the cantilever configuration illustrated in FIGS. 5A-5F.

Yet another embodiment of the above elements includes the provision for active mechanical and/or electrical actuation of the gas/fluid channels (see above and the drawings of FIG. 6). The channels can be moved into and away from the tip platform, to act as a clamp or release on the primary cantilever tip platform. Arm motion may be accomplished by one or more independent thermal actuators (see FIG. 6), electrostatic actuators, or piezoelectric actuators. The arms may be used to stiffen or immobilize the tip bearing cantilever without the presence or aid of secondary cantilevers or beams behind the primary cantilever.

In operation if the tip platform is pressed back to the secondary cantilevers or support beam and the fluid channel is flexed in the channel cams and locks the platform against the secondary cantilevers or beam. If on the other hand the tip platform is not pressed back, then the edges of the fluid channel wedge under the tip platform and separate it positively from the secondary cantilevers or beam. In operation, this design may include two paddles on long cantilevers within the handle layer rear fluid channels. These respond to long wavelength modulation of a typical AFM acoustic tip drive to move up and down perpendicular to the plane of the cantilever assembly and in conjunction with the check valves and/or openings depending from the front cover and from the handle cavities to the two fluid arms act to pump surrounding gas or fluid through the channels over the tip and subject area. The quantity of fluid or ionized gas can be controlled by a software module which allows the operator to change the duty cycle of the long wave acoustic excitation.

What is claimed is:

1. A method for scanning probe microscopy (SPM) comprising:
   inducing nanocavitation effects on a target surface with a nanocavitation inducing member;
   applying an excitation signal to vary the distance between the nanocavitation inducing member and the target surface in accordance with the excitation signal; and
   scanning the nanocavitation inducing member across the target surface during the step of applying the excitation signal,
   wherein inducing nanocavitation effects includes creating a plurality of cavitation bubbles.

2. The method as recited in claim 1, wherein scanning the nanocavitation inducing member across the target surface serves to perform nanomachining operations upon the target surface.

3. The method as recited in claim 1, wherein the step of creating a plurality of cavitation bubbles includes oscillating a MEMS device within a fluidic medium.

4. The method as recited in claim 3, wherein the nanocavitation inducing member comprises a cantilever, wherein the MEMS device is disposed at a tip of the cantilever, wherein a fluid in the fluidic medium is delivered by one or more fluidic channels formed in the cantilever.

5. The method as recited in claim 1, wherein scanning the nanocavitation inducing member across the target surface serves to perform imaging operations on the target surface.

6. The method as recited in claim 1, wherein scanning the nanocavitation inducing member across the target surface serves to perform measuring operations on the target surface.

* * * * *